US008433765B2

(12) United States Patent  
Dolin

(10) Patent No.: US 8,433,765 B2
(45) Date of Patent: Apr. 30, 2013

(54) TECHNIQUES TO MODIFY AND SHARE BINARY CONTENT WHEN DISCONNECTED FROM A NETWORK

(75) Inventor: Robert M Dolin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 12/818,468

(22) Filed: Jun. 18, 2010

(65) Prior Publication Data

US 2011/0314528 A1 Dec. 22, 2011

(51) Int. Cl.
*G06F 15/16* (2006.01)
(52) U.S. Cl.
USPC .......................................................... 709/206
(58) Field of Classification Search .................. 709/206
See application file for complete search history.

(56) References Cited

U.S. PATENT DOCUMENTS

| | | | | |
|---|---|---|---|---|
| 7,933,972 | B1* | 4/2011 | Issa et al. .................. | 709/219 |
| 8,166,407 | B2* | 4/2012 | Lee et al. ................... | 715/751 |
| 8,180,852 | B2* | 5/2012 | Lee et al. ................... | 709/218 |
| 8,181,110 | B2* | 5/2012 | Worthington ............. | 715/716 |
| 2005/0027713 | A1* | 2/2005 | Cameron et al. .......... | 707/100 |
| 2005/0243381 | A1 | 11/2005 | Hill | |
| 2008/0196040 | A1* | 8/2008 | Mochel et al. ............ | 719/316 |
| 2009/0300139 | A1* | 12/2009 | Shoemaker et al. ...... | 709/217 |
| 2010/0054600 | A1 | 3/2010 | Anbalagan | |
| 2010/0063961 | A1* | 3/2010 | Guiheneuf et al. ....... | 707/622 |
| 2010/0235765 | A1* | 9/2010 | Worthington .............. | 715/760 |

OTHER PUBLICATIONS

"Album Privacy: Album visibility", Picasa and Picasa Web Albums Help, Feb. 27, 2010, 1 page. http://picasa.google.com/support/bin/answer.py?answer=39551.
"How to Enable Facebook Notifications in your Mail Inbox", ChoosyInfo, Jan. 13, 2010, 6 pages. http://choosyinfo.com/how-to-enable-facebook-notifications-in-your-mail-inbox.html.
Lewis, Robb, "iLoader", Feb. 23, 2010, 10 pages. http://appadvice.com/appnn/2010/02/review-iloader/.
"Name Tags: Name tags and Google Account contacts", Picasa and Picasa Web Albums Help, Feb. 23, 2010, 1 page. http://picasa.google.com/support/bin/answer.py?answer=112773.
"PicMe Photo Sharing 2.01", Mar. 13, 2008, 6 pages. http://download.cnet.com/PicMe-Photo-Sharing/3000-12511_4-10710679.html.
"Sync to Web: 'Sync to Web' basics", Picasa and Picasa Web Albums Help, Jun. 15, 2009, 1 page. http://picasa.google.com/support/bin/answer.py?hl=en&answer=106176.
"Wikimap Lite & Wikimap", Dec. 22, 2009, 5 pages. http://wiki.alumni.net/wiki/Wikimap.

* cited by examiner

*Primary Examiner* — Brian P Whipple

(57) ABSTRACT

Techniques to modify and share binary objects when disconnected from a network are described. An apparatus may comprise a processor and a memory. The memory may be operative to store a media annotation component and a media publishing component. The media annotation component, when executed by the processor, may be operative to receive a list of related members having a defined relationship with a publishing member from a user account of the publishing member of a media sharing service when in an online mode, and generate metadata for a media object using the list of related members when in an offline mode to form an annotated media object. The media publishing component, when executed by the processor, may be operative to define at least one instruction to distribute the annotated media object to a related member when in the online mode. Other embodiments are described and claimed.

20 Claims, 8 Drawing Sheets

600

RECEIVE A RELATED MEMBER LIST HAVING RELATED MEMBERS WITH A DEFINED RELATIONSHIP WITH A PUBLISHING MEMBER FROM A USER ACCOUNT OF A MEDIA SHARING SERVICE WHEN IN AN ONLINE MODE
602

ASSOCIATE A PORTION OF AN IMAGE OF A PERSON PRESENTED IN A MEDIA OBJECT WITH A RELATED MEMBER FROM THE LIST OF RELATED MEMBERS WHEN IN AN OFFLINE MODE
604

GENERATE METADATA FOR THE MEDIA OBJECT BASED ON THE ASSOCIATION BETWEEN THE PERSON PRESENTED IN THE MEDIA OBJECT AND THE RELATED CLIENT WHEN IN THE OFFLINE MODE TO FORM AN ANNOTATED MEDIA OBJECT
606

DEFINE ONE OR MORE INSTRUCTIONS TO SHARE THE ANNOTATED MEDIA OBJECT WITH A RELATED CLIENT WHEN IN THE OFFLINE MODE
608

STORE THE ONE OR MORE INSTRUCTIONS IN AN INSTRUCTION QUEUE WHEN IN THE OFFLINE MODE FOR EXECUTION WHEN IN THE ONLINE MODE
610

*FIG. 6*

TECHNIQUES TO MODIFY AND SHARE BINARY CONTENT WHEN DISCONNECTED FROM A NETWORK

BACKGROUND

Communication systems are increasingly used for sharing binary content, such as photographs, videos, files and so forth. Typically sharing binary content is limited by network connectivity. For instance, conventional systems typically deliver shared binary content by publishing it using a client-server model over a network. For instance, a user may publish a photograph on a social networking system (SNS) for consumption by other users of the same SNS. However, when a user is disconnected from a network, access to binary content stored by a SNS is typically unavailable to the user. Furthermore, a user is unable to perform any operations for binary content stored by a SNS when disconnected from a network. For instance, a user may be unable to tag a photograph with any metadata, such as a name for a person in the photograph. As such, a substantial need exists for enhanced techniques for sharing binary content in a communication system. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to modify and share binary content when disconnected from a network. Some embodiments are particularly directed to enhanced techniques to receive certain information from a media sharing service when connected to a network that may be useful for processing media objects when disconnected from the network. For instance, the received information may be used to annotate binary content with metadata when disconnected from the network. Instructions for the annotated binary content may also be generated and queued when disconnected from the network. Once re-connected to a network, the annotated binary content may be processed in accordance with the queued instructions.

In one embodiment, for example, an apparatus such as a computing device may comprise a processor and a memory communicatively coupled to the processor. The memory may be operative to store a media annotation component and a media publishing component. The media annotation component, when executed by the processor, may be operative to receive a list of related members having a defined relationship with a publishing member from a user account of the publishing member of a media sharing service when in an online mode, and generate metadata for a media object using the list of related members when in an offline mode to form an annotated media object. Additionally or alternatively, the media annotation component may receive other data or metadata associated with the publishing member of the media sharing service, such as events for the publishing member, previously used keywords or metadata tags, groups for the publishing member, and so forth. The media publishing component, when executed by the processor, may be operative to define at least one instruction to distribute the annotated media object to one or more related members when in the online mode. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow for a publishing system.

DETAILED DESCRIPTION

Figure 1:
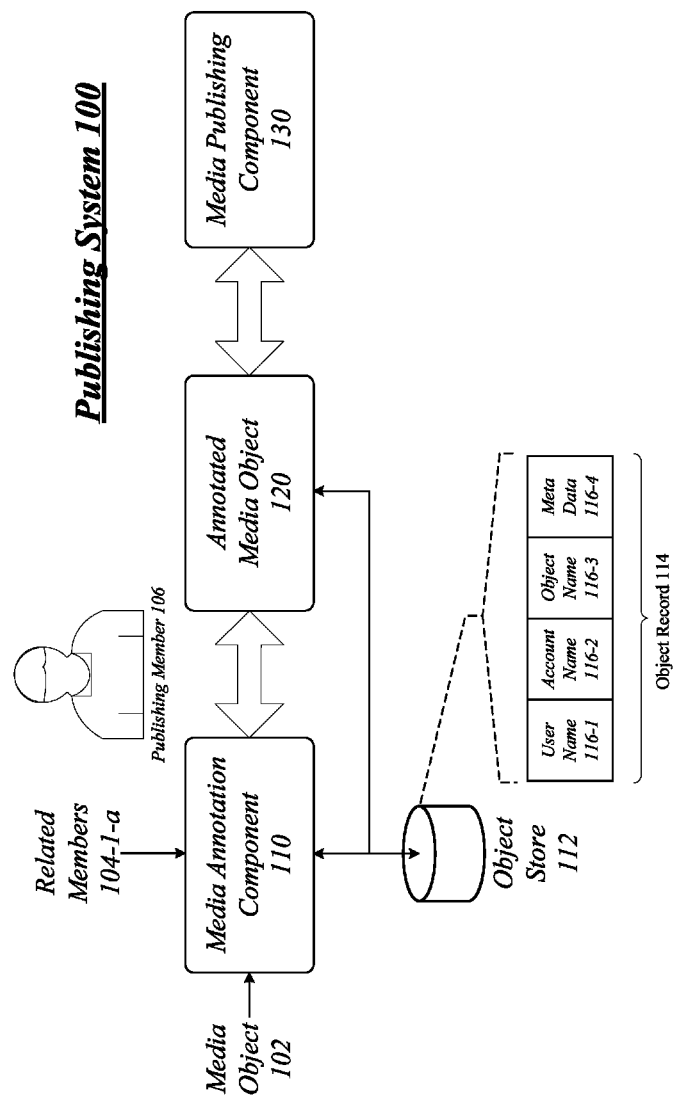
FIG. 1 illustrates an embodiment of a first publishing system.

Various embodiments are generally directed to techniques to modify and share binary content when disconnected from a network. Some embodiments are particularly directed to enhanced techniques to receive certain information from a media sharing service when connected to a network that may be useful for processing media objects when disconnected from the network. For instance, the received information may be used to annotate binary content with metadata when disconnected from the network. Instructions for the annotated binary content may also be generated and queued when disconnected from the network. Once re-connected to a network, the annotated binary content may be processed in accordance with the queued instructions. For instance, the annotated binary content may be shared with related members of a group, such as friends in a social networking service (SNS), published to an SNS, or otherwise distributed over a network. As a result, the embodiments can improve affordability, scalability, modularity, extendibility, or interoperability for an operator, device or network.

While various online media sharing services are convenient for distributing or publishing binary content, such sharing is typically limited by network connectivity. Conventional systems typically deliver shared binary content by publishing it using a client-server model over a network. For instance, a user may publish a photograph on a SNS for consumption by other users of the same SNS. However, when a user is disconnected from a network, access to binary content stored by a SNS is typically unavailable to the user. Furthermore, a user is unable to perform any operations for binary content stored by a SNS when disconnected from a network. For instance, a user may be unable to tag a photograph with any metadata, such as a name for a person in the photograph, or otherwise edit the photograph when disconnected from a network. As can be appreciated, there are many time periods where a user is offline and would desire to annotate, modify or otherwise prepare a media object for network distribution to other users for public or private consumption.

To solve these and other problems, various embodiments implement enhanced techniques for receiving information from one or more media sharing services when connected to a network. Connection to a network may be referred to herein as an "online mode." A publishing member may modify the received binary content when disconnected from the network using the received information. Disconnection from a network may be referred to herein as an "offline mode." For instance, while in an offline mode, a publishing member may associate metadata with the binary content, edit the binary content using a media editing application, and other operations typically performed for media objects. Furthermore, instructions for the modified binary content may also be generated and queued when in the offline mode. For instance, the instructions may be for publishing or distributing modified binary content via one or more media sharing services, or by directly communicating modified binary content to other related members of the publishing member. Once the publishing member enters an online mode by connecting to a network, the modified binary content may be processed in accordance with the queued instructions. For instance, the modified binary content may be shared with related members of a group, such as friends in a SNS, published to an SNS, or otherwise distributed over a network.

FIG. 1 illustrates a block diagram for a system 100 to modify and share binary objects when disconnected from a network. In one embodiment, for example, the publishing system 100 may comprise a computer-implemented system 100 having multiple components 110, 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the publishing system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the publishing system 100 as shown in FIG. 1 has a limited number of elements in a certain topology, it may be appreciated that the publishing system 100 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 1, the publishing system 100 includes a media annotation component 110. The media annotation component 110 may be arranged to receive as input a media object 102 and a list of related members 104-1-*a*, and to output an annotated media object 120. In one embodiment, for example, the media annotation component 110 may be implemented as a software element stored in a memory and executed by a processor. It is worthy to note that "a" and "b" and "c" and similar designators as used herein are intended to be variables representing any positive integer. Thus, for example, if an implementation sets a value for a=5, then a complete list of related members may include related members 104-1, 104-2, 104-3, 104-4 and 104-5.

Figure 3:
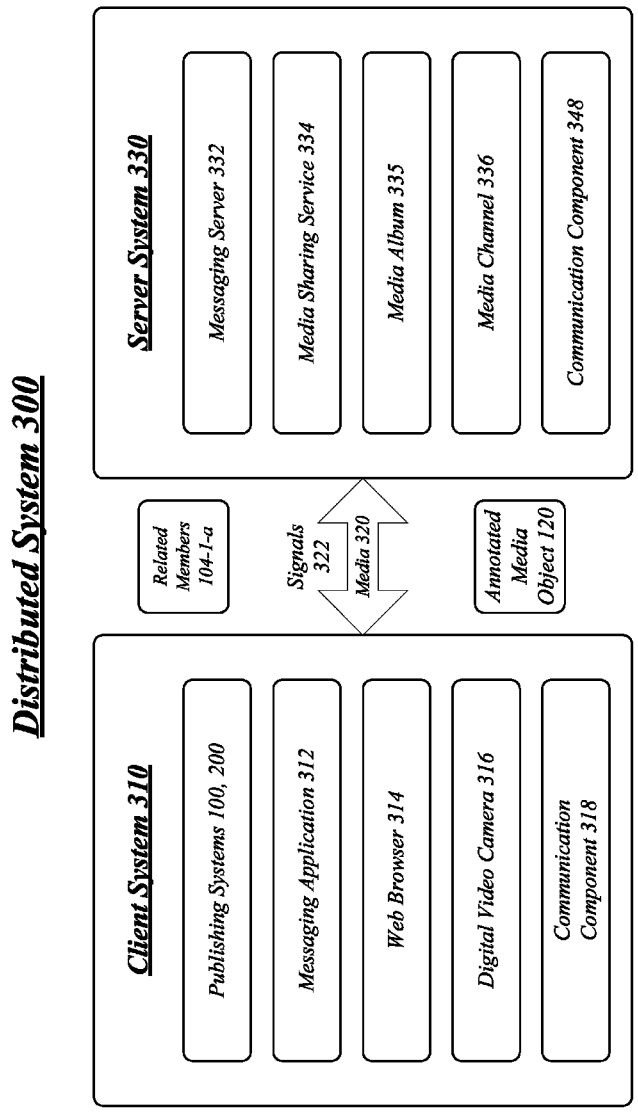
FIG. 3 illustrates an embodiment of a client-server distributed system for implementing one or both publishing systems as described with reference to FIGS. 1, 2.

The media annotation component 110, when executed by a processor, may be operative to receive a list of related members 104-1-*a* each having a defined relationship with a publishing member 106 from a user account of the publishing member 106 of a media sharing service (e.g., as shown in FIG. 3) when in an online mode. The media annotation component 110 may generate metadata for a media object 102 using the list of related members 104-1-*a* when in an offline mode to form an annotated media object 120. The media annotation component 110 may store the received list of related members 104-1-*a* in an object store 112. Additionally or alternatively, the media annotation component 110 may store the received list of related members 104-1-*a* as part of a contact database (not shown) implemented for a computing device implementing the publishing system 100.

The media annotation component 110 may receive a list of related members 104-1-*a* from a user account of the publishing member 106 of a media sharing service when in an online mode. A media sharing service may generally comprise any application or service provided over a network to publish, distribute, disseminate or otherwise share information over a network. In various embodiments, a media sharing service may comprise or be implemented as a web service arranged to distribute or share binary content among a group or members of the web service. Examples of a media sharing service may include without limitation a Social Networking System (SNS), Instant Messaging (IM) network, group membership or other online software platforms arranged to facilitate distribution and sharing of binary content among various members of a defined group. Examples of SNS may include without limitation MICROSOFT® WINDOWS LIVE®, MYSPACE®, FACEBOOK®, LINKEDIN®, TWITTER®, BEBO® and other social networking services consistent with the described embodiments. Examples of an IM network may include without limitation WINDOWS LIVE MESSENGER, GOOGLE CHAT, AOL®, SKYPE®, and any other IM networks consistent with the described embodiments. Examples of group services may include without limitation YAHOO® GROUPS, GOOGLE® Groups, and any other group services consistent with the described embodiments. Examples of other online software platforms may include without limitation WINDOWS LIVE SKYDRIVE, GOOGLE DOCS, GOOGLE PICASA, BOX.NET, BOXEE, FLICKR® and any other online software platforms consistent with the described embodiments. The embodiments are not limited in this context.

The list of related members 104-1-a may each have a defined relationship with the publishing member 106. In many cases, members of a media sharing service may be related members having some form of a defined relationship with each other giving permission to access binary content published by other related members. Such related members are sometimes referred to informally as "friends" or "buddies." The defined relationship may be any form of relationship giving a certain level of permission to access shared binary content of a publishing member or a related member. In some cases, for example, the defined relationship may comprise a dyadic relationship. A dyadic relationship may refer to members of a group having an ongoing relationship or interaction. An example of a dyadic relationship may be friends in a SNS. In one embodiment, the members of a group may include a publishing member and two or more related members each having a defined relationship with the publishing member. For instance, a first friend may have defined relationships with each of a second friend and a third friend, although the second and third friends may or may not have a defined relationship with each other. In one embodiment, the members of a group may include a publishing member and two or more related members each having a defined relationship with the publishing member and each other. For instance, a first friend may have defined relationships with each of a second friend and a third friend, and the second and third friends may also have a defined relationship with each other. In this case, the first, second and third friends may be referred to as "mutual friends" as they form a triangular relationship among each other. The concept of "mutual friends" may automatically apply to members within a specifically defined relationship group, such as a message group, an IM group, a security group, a business group, or any other aggregated pool of users. In another example, a first friend may have defined relationships with each of a fourth friend and a fifth friend, and the fourth friend and the fifth friend may not have a defined relationship with each other. In this case, the fourth and fifth friends have a second degree relationship with each other through the first friend. It may be appreciated that a group of related members 104-1-a may comprise any defined group, including without limitation a public group, all "friends" on one or more services, a specific category of "friends" within one or more services, a group of people from a particular geographic region, a group of people from a particular company or educational institution, a specific list of individuals, and any other group comprising two or more members. It may also be appreciated that a dyadic relationship may include more than three clients or friends as desired for a given implementation. The embodiments are not limited in this context.

In addition to receiving the list of related members 104-1-a, the media annotation component 110 may also receive one or more media objects 102 either in an online mode, an offline mode, or both an online mode and an offline mode. During an online mode, the media annotation component 110 may receive one or more media objects 102 from a network device, such as a server implementing a media sharing service over a public network connection (e.g., the Internet), or another device such as a digital camera or laptop over a Bluetooth connection. During an offline mode, the media annotation component 110 may receive one or more media objects 102 from a local component implemented on a same device with the publishing system 100, such as a digital camera or video recorder. The embodiments are not limited in this context.

The one or more media objects 102 may be stored in the object store 112. The object store 112 generally manages media objects on behalf of the publishing system 100. The object store 112 provides methods and data for storing, accessing, and otherwise managing media objects for the publishing system 100. For example, the object store 112 may be used by the media annotation component 110 and the media publishing component 130 to store respective media objects 102 and annotated media objects 120. The object store 112 handles requests for objects, by determining where the requested objects are and retrieving them from the determined locations. Thus, the object store 112 can determine whether objects are on a local device, such as in a file system or a cache of a computing device implementing the publishing system 100, or a remote device such as in a web service, web application, or other network storage location. The object store 112 can provide degrees of data security by encrypting data, such as by hashing identifier data associated with an object.

In some embodiments, the object store 112 may be implemented as volatile or non-volatile memory. For instance, the object store 112 may comprise local files stored in non-volatile memory. In another example, the object store 112 may be implemented as part of a cache, such as a web browser cache such as the WINDOWS INTERNET EXPLORER® cache, which is the cache used by the WINDOWS INTERNET EXPLORER made by MICROSOFT, Redmond, Wash. In this implementation, when an object is retrieved from a web address (e.g., a uniform resource locator (URL)), the object store 112 will automatically write the object into the cache. If an object is retrieved from a location other than a URL location, the object store 112 will request that a transport protocol stack retrieve the object, and the object store 112 writes the object to the cache.

The media object 102 may be a form of binary content. Binary content may generally refer to any discrete set of data such as a computer file having any type of data encoded in binary form for computer storage and processing purposes. The media object 102 may represent any type of media information stored in object form. In various embodiments, data in an object may comprise any Binary Large Objects (BLOB) of data of any size or type. Examples for the media object 102 may include without limitation an object comprising any type of multimedia data including text, audio, sounds, video, audio/video (A/V), images, graphics, photographs, animation, application data, multimedia data, metadata, compressed data, and any other data consistent with the embodiments. The embodiments are not limited in this context.

The media annotation component 110 may generate metadata 116-4 for the media object 102 using the list of related members 104-1-a when in an offline mode to form an annotated media object 120. The media annotation component 110 may store the annotated media object 120 in the object store 112.

In one embodiment, the media annotation component 110 may annotate the media object 102 using identification information for the related members 104-1-a. More particular, the media annotation component 110 may store a metadata tag with identification information for the related member. A metadata tag is typically a non-hierarchical keyword or term assigned to a piece of information, such as the media object 102. A metadata tag may assist in describing the media object 102 and allows the media object 102 to be found again by browsing or search operations. For instance, assume the media object 102 is a photograph. The media annotation component 110 may associate a portion of an image of a person presented in the media object 102 with a related member 104-1 (e.g., a friend Mary) from the list of related members 104-1-a when in an offline mode. The media annotation component 110 may generate a metadata tag for the media object 102 based on the association between the person presented in the media object 102 and the related member 104-1 to form the annotated media object 120. For instance, the media annotation component 110 may generate a metadata tag in the form of a label with "Mary" that is displayed when a pointing device rolls over the image of Mary in the media object 102. Annotation operations are sometimes referred to informally as "tagging" operations. In one embodiment, all of the annotation operations may occur when the publishing system 100 is in an offline mode using information that was retrieved while in an online mode, thereby enhancing convenience for a publishing member to prepare and publish media objects for public or private display.

The media annotation component 110 may generate and store an object record 114 corresponding to the annotated media object 120. The object record 114 may store various types of information for the media object 102 and/or the annotated media object 120. In one embodiment, the object record 114 may form an integral part of the annotated media object 120. In one embodiment, the object record 114 may be associated with the media object 120 to form the annotated media object 120.

The media annotation component 110 may generate and store the object record 114 with various data elements 116-1-b as desired for a given implementation. As shown, the media annotation component 110 may generate and store the object record 114 with four data elements 116-1 to 116-4, including a user name 116-1, an account name 116-2, an object name 116-3 and metadata 116-4. The user name 116-1 may comprise a name for the publishing member 106. The account name 116-2 may comprise an account name or screen name associated with a particular online service, such as a media sharing service. The object name 116-3 may comprise a globally unique identifier (GUID) for the media object 102. The metadata 116-4 may comprise metadata information associated with the media object 102. An example for the object record 114 may include a user name of "Jane Doe," an account name 116-2 of "jdoe@live.com," an object name 116-3 of "Birthday Picture" (or hash value for "Birthday Picture") for the media object 102, and metadata 116-4 comprising two metadata tags identifying the faces of "Jane Doe" and "John Doe" in the media object 102.

The media annotation component 110 may store a metadata tag with identification information for a related members 104-1-a as part of hierarchical set of metadata when in the offline mode. A metadata tag is typically a non-hierarchical keyword or term assigned to a piece of information, such as the media object 102. Although a metadata tag is typically a non-hierarchical keyword or term, a metadata tag may be stored as part of a hierarchy of managed vocabulary terms in a managed taxonomy for a managed system. The media annotation component 110 may allow the publishing member 106 to annotate the media object 102 using a metadata tag, and then store the metadata tag as part of a hierarchical set of metadata terms. For instance, if the media object 106 has been annotated with a metadata tag for "Mary," the metadata tag of "Mary" may be stored as part of a hierarchical set of metadata terms, such as Pictures/Vacation/Hawaii/Luau/Mary. The hierarchical set of metadata terms may be used for any number of applications, such as integrating a new metadata tag into a managed taxonomy, storing the annotated media object 120 in a particular media album, and so forth.

In the illustrated embodiment shown in FIG. 1, the publishing system 100 further includes a media publishing component 130. The media publishing component 130 may generally perform publishing operations to electronically produce and disseminate information over a network. The media publishing component 130 may be particularly arranged to publish the annotated media object 120 over a network to one or more of the related members 104-1-a, or to a media publishing service implemented by a network device, such as a web server. The media publishing component 130 may be arranged to receive as input the annotated media object 120, and publish the annotated media object 120 to a media publishing service and/or one or more related members 104-1-a when in an online mode. In one embodiment, for example, the media publishing component 130 may be implemented as a software element stored in a memory and executed by a processor.

The media publishing component 130, when executed by the processor, may be operative to define at least one instruction to distribute or share the annotated media object 120 to a media publishing service and/or one or more related members 104-1-a. As with the annotation operations performed by the media annotation component 110, defining instructions to distribute or share the annotated media object 120 may also be performed when in the offline mode using information that was retrieved while in an online mode, thereby enhancing convenience for a publishing member to prepare and publish media objects for public or private display. The media publishing component 130 may store the one or more instructions in an instruction queue when in the offline mode for execution when in the online mode.

The media publishing component 130 may be used to define one or more instructions for processing the annotated media object 120, and store the defined instructions in an instruction queue as discussed with reference to FIG. 2. The instructions may be for various applications and/or services to execute when in the online mode as defined and stored in the offline mode. In some cases, the instructions may be for applications and/or services implemented by a same device as the publishing system 100. For instance, the stored instructions may be for a messaging application implemented with the publishing system 100, and when in the online mode, the messaging application may retrieve and execute the stored instructions. In some cases, the stored instructions may be for applications and/or services implemented by a different device (e.g., a remote device) than used for implementing the publishing systems 100, 200 (e.g., a local device). For instance, the stored instructions may be for a media sharing service implemented by a remote device such as a network server, while the publishing system 100 is implemented by a local device such as a client computing device. In this case, the stored instructions may be sent to the remote device for execution by an application and/or service implemented by the remote device.

Figure 2:
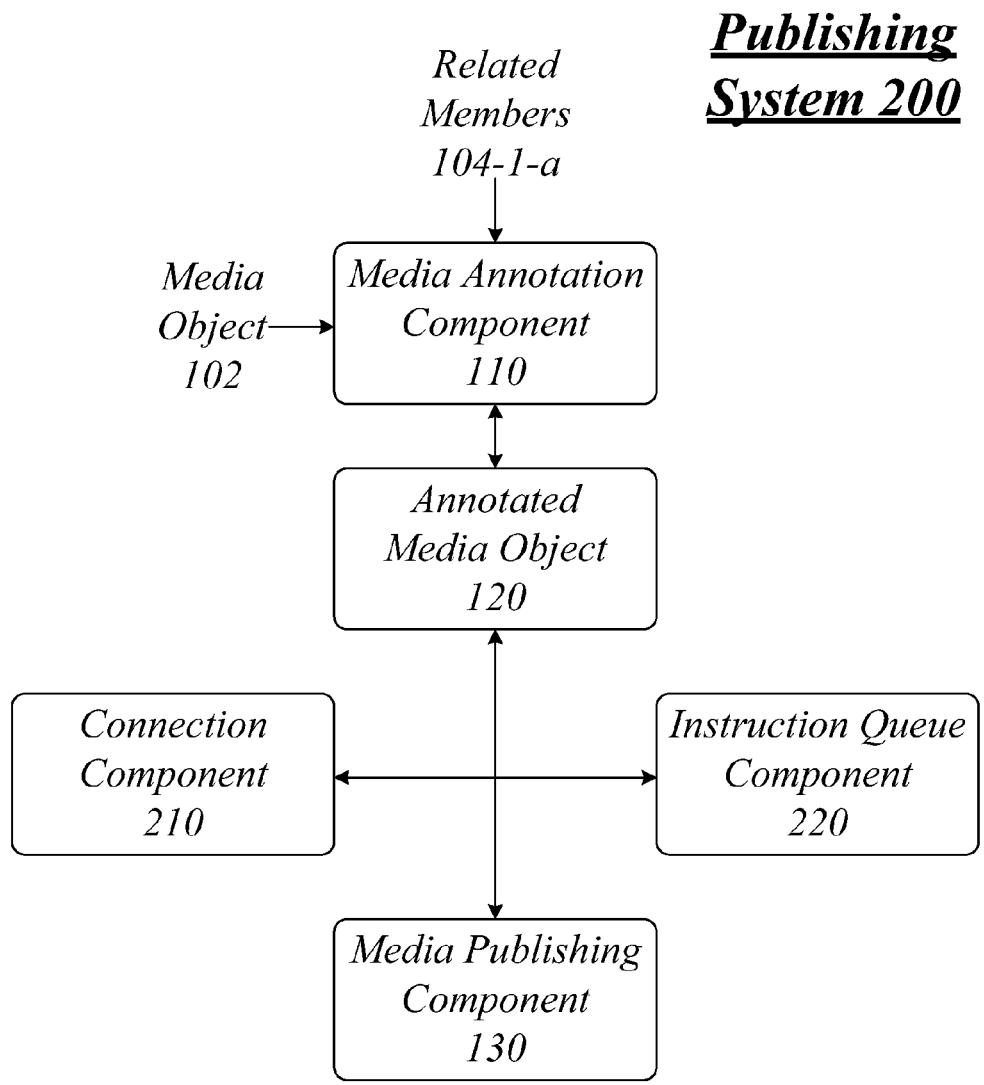
FIG. 2 illustrates an embodiment of a second publishing system similar to the first publishing system with additional components.

FIG. 2 illustrates a block diagram of a system 200 to modify and share binary objects when disconnected from a network. The publishing system 200 may be similar to the publishing system 100, and may further comprise a connection component 210 and an instruction queue component 220.

The connection manager component 210 may be arranged to generally manage connections for various media sharing services on behalf of the publishing systems 100, 200. The connection manager component 210 may store connection information for different media sharing services, and use the connection information to automatically connect to the different media sharing services when in an online mode. For instance, the connection manager component 210 may establish a connection to retrieve a list of related members 104-1-a and/or the media object 102, publish the annotated media object 120, relay various queued instructions for execution by a media sharing service or other service implemented by a remote device, and so forth.

In one embodiment, for example, the connection manager component 210 may manage multiple sets of connection information for multiple user accounts of multiple media sharing services. Each set of connection information may include login information, such as an account identifier and security credentials to access a user account of a respective media sharing service. For instance, assume a media sharing service is MICROSOFT LIVE. The connection manager component 210 may store an account profile for a user, such as the publishing member 106, with the account profile including login information for a MICROSOFT LIVE user account for the publishing member 106. The login information may include an account identifier such as "john@live.com" and a security credential such as "p@ssW0rd." Additionally or alternatively, the security credential can be implemented using a different security scheme, such as authentication tokens, for example.

The connection manager component 210 may automatically connect to a user account of a media sharing service when in the online mode using a set of connection information including an account identifier and security credentials for the user account. For instance, the connection manager component 210 may detect that the publishing systems 100, 200 have transitioned to an online mode, and establish a connection with a media sharing service automatically with little if any human intervention by the publishing member 106. In one embodiment, for example, human intervention by the publishing member 106 may be limited to providing user interface views requesting decisions from the publishing member 106 (e.g., "Would you like to connect to MICROSOFT LIVE"), and receiving control directives representing decisions made by the publishing member 106.

The instruction queue component 220 may be generally arranged to manage instructions defined when the publishing systems 100, 200 are in an offline mode. The instruction queue component 220 may store instructions in a data structure such as an instruction queue as each instruction is defined during the offline mode.

In one embodiment, the instruction queue component 220 may receive and store each instruction in a first-in-first-out (FIFO) as each instruction is received without any ordering operations performed on the received instructions. In a FIFO data structure, a first element added to a queue will be the first one to be removed from the queue. Although instruction queue component 220 may be described using a FIFO, it may be appreciated that other data structures may be used, including last-in-first-out (LIFO) data structure, a linked list, and so forth. The embodiments are not limited in this context.

In one embodiment, the instruction queue component 220 may operate on an assumption that a user will define a set of instructions in a certain temporal sequence during the offline mode, and that the same temporal sequence should be used to execute the instructions when in the online mode. For instance, assume the publishing member 106 defines a first instruction to create a new media album named "summer vacation" and a second instruction to store a photograph with metadata indicating an image of "Alice" in the media album named "summer vacation." As such, the instruction queue component 220 may store the first and second instructions in a certain temporal order using FIFO data structure.

In one embodiment, the instruction queue component 220 may receive instructions and perform ordering operations on the received instructions before or after storing the instructions in an instruction queue. In this case, the instruction queue component 220 may store received instructions in any temporal order in accordance with a set of defined storage rules and storage criteria. For instance, the publishing member 106 may define certain instructions that do not require any temporal order. For instance, assume the publishing member 106 defines a first instruction to send a picture with metadata indicating an image of "Bob" to a friend "Mary," and a second instruction to send the same picture to a friend "Joe," and does not indicate any control directive indicating an order for sending operations. In this case, the instruction queue component 220 may receive the first and second instructions in a first order, and store the first and second instructions in a second order in accordance with a set of defined storage rules and storage criteria. For instance, assume a storage criterion of relationship level has been defined, and a relationship attribute for "Mary" is set to "Social Friend" and a relationship attribute for "Joe" is set to "Sibling." A storage rule may be established to send the annotated media object 120 on a priority basis, with the priority comprising an order of "Siblings," "Social Friends," and "Work Friends." In this case, the instruction queue component 220 may store the second instruction in a FIFO before the first instruction to ensure the second instruction is executed before the first instruction when in the online mode. This occurs even though the first instruction was received before the second instruction when in the offline mode. It may be appreciated that any number of storage criteria and storage rules may be defined as desired for a given implementation, and the embodiments are not limited in this context.

The instruction queue component 220 may execute instructions stored in the instruction queue when in the online mode in a sequential manner or a parallel manner. For instance, assume the stored instructions need to be executed in a certain sequence, where a current instruction is completely executed before a next instruction can be executed. In this case, the instruction queue component 220 may execute and/or send the stored instructions in a sequential manner, and may wait for acknowledgements indicating execution for a current instruction is complete before executing and/or sending a next instruction. In another scenario, assume the stored instructions do not need to be executed in a certain sequence. In this case, the instruction queue component 220 may execute and/or send the stored instructions in a parallel manner, without waiting for any acknowledgements indicating execution for a current instruction is complete before executing and/or sending a next instruction.

FIG. 3 illustrates a block diagram of a distributed system 300. The distributed system 300 may distribute portions of the structure and/or operations for the publishing systems 100, 200 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement one or both of the publishing systems 100, 200, a messaging application 312, a web browser 314, a digital video camera 316 (or digital camera)

and a communication component 318. A server system 330 may implement a messaging server 332, a media sharing service 334, a media album 335, a media channel 336, and a communication component 348. The client system 310 and the server system 330 may communicate with each over a communications media 320 using communications signals 322 via the communications components 318, 348. In one embodiment, for example, the communications media may comprise a public or private network. In one embodiment, for example, the communications signals 322 may comprise wired or wireless signals. Computing aspects of the client system 310 and the server system 330 may be described in more detail with reference to FIG. 7. Communications aspects for the distributed system 300 may be described in more detail with reference to FIG. 8.

In various embodiments, the client system 310 may comprise the messaging application 312. The messaging application 312 may comprise any type of messaging application, such as a unified messaging (UM) application, an e-mail application, a voicemail application, an instant messaging (IM) application, a group IM application, presence application, audio-video conferencing application, short message service (SMS) application, multimedia message service (MMS) application, and/or other types of communications and/or messaging programs, applications, or services in accordance with the described embodiments.

In various embodiments, the client system 310 may comprise a web browser 314. The web browser 314 may comprise any web browser suitable for use in accessing web applications provided by the server system 330. Examples of suitable web browsers may include MICROSOFT INTERNET EXPLORER®, GOOGLE® CHROME and APPLE® SAFARI, to name just a few. The embodiments are not limited in this context.

In various embodiments, the server system 330 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 330 may include, for example, stand-alone and enterprise-class server computers operating a server OS such as a MICROSOFT OS, a UNIX® OS, a LINUX® OS, or other suitable server-based OS. Exemplary server programs may include, for example, communications server programs such as MICROSOFT WINDOWS LIVE or MICROSOFT OFFICE COMMUNICATIONS SERVER (OCS) for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

In the illustrated embodiment shown in the distribute system 300, the server system 330 may implement a messaging application 332 similar to the messaging application 312. The publishing member 106 may access and use the messaging application 332 of the server system 330 using the web browser 314 as an alternative to the messaging application 312 of the client system 310.

In one embodiment, the server system 330 may implement a media sharing service 334. Examples for the media sharing service 334 may include any online service capable of distributing or publishing media information. In one embodiment, the media sharing service 334 may be implemented as a SNS including without limitation MICROSOFT WINDOWS LIVE, MYSPACE, FACEBOOK, LINKEDIN, TWITTER, BEBO, and any other social networking services consistent with the described embodiments. In one embodiment, the media sharing service 334 may be implemented as an image hosting and video hosting web service, such as WINDOWS LIVE PHOTO GALLERY, FLICKR®, SHUTTERFLY®, YOUTUBE®, and so forth.

In one embodiment, the server system 330 may implement or store one or more media albums 335 for the publishing member 106. A media album 335 may comprise an electronic collection of media objects, such as various media objects 102 and annotated media objects 120. The media album 335 may organize and store a digital photograph collection for access by the publishing member 106 and one or more related members 104-1-a based on a level of access granted each of the one or more related members 104-1-a.

In one embodiment, the server system 330 may implement or store one or more media channels 336 for the publishing member 106. A media channel 336 identifies a media channel for the publishing member 106. The media channel 336 may comprise a web page for the publishing member 106 which can be used to display information authored by the publishing member 106, including various media objects 102 and annotated media objects 120.

The distributed system 300 may illustrate a case where the publishing systems 100, 200 define and execute publishing instructions on different devices. For instance, the client system 310 may implement the publishing systems 100, 200 to define a publishing instruction for execution by the server system 330.

In the illustrated embodiment shown in FIG. 3, the publishing systems 100, 200 may be used to modify binary content when disconnected from a network, and define instructions to share the modified binary content when connected to a network. The client system 310 may use the connection component 210 of the publishing systems 100, 200 to establish a connection with the server system 330 via connection information sent/received over the communications media 320 via the communications signals 322 to enter an online mode.

When in the online mode, the publishing systems 100, 200 may receive the list of related members 104-1-a from the media sharing service 334. The publishing systems 100, 200 may optionally receive one or more media objects 102 from the media sharing service 334, the media album 335, and/or the media channel 336. Additionally or alternatively, one or more media objects 102 may be received locally from the digital video camera 316. When the connection between the client system 310 and the server system 330 is intentionally or unintentionally terminated, the client system 310 may enter an offline mode.

When in the offline mode, the publishing member 106 may use the list of related members 104-1-a to edit the media object 102 in preparation for returning to the online mode. For instance, the publishing member 106 may use the media annotation component 110 of the publishing systems 100, 200 to generate metadata for the media object 102 using the list of related members 104-1-a, annotate the media object 102 with the generated metadata to form the annotated media object 120, and use the object store the annotated media object 120 in the object store 112. The publishing member 106 may further use the media publishing component 130 of the publishing systems 100, 200 to define one or more instructions for publishing the annotated media object 120 for storage by the instruction queue component 220. For instance, the publishing member 106 may use the media publishing component 130 to define a publish instruction to update a user tile for a profile page of the media sharing service 334 with the annotated media object 120.

Once the client system 310 re-establishes or restores a connection with the server system 330, the instruction queue component 220 of the publishing systems 100, 200 may manage execution of the stored instructions by sending the stored instructions from the instruction queue to an application and/or service actually executing the instruction. Instructions for execution by a remote device such as the server system 330 may be sent using a number of different transports, including the messaging application 312, the web browser 314, and/or other transports provided by the communication component 318.

In one embodiment, the media publishing component 130 may define an instruction to send the annotated media object 120 to the media sharing service 334 when in the offline mode. For instance, the instruction queue component 220 may send the publish instruction to update a user tile for a profile page of the media sharing service 334 with the annotated media object 120 via the communication component 318 (e.g., an API for the media sharing service 334) or the web browser 314 (e.g., a HTTP request-response) to the media sharing service 334. The media sharing service 334 may receive the publish instruction, and execute the publish instruction per normal update operations for the media sharing service 334.

Figure 4:
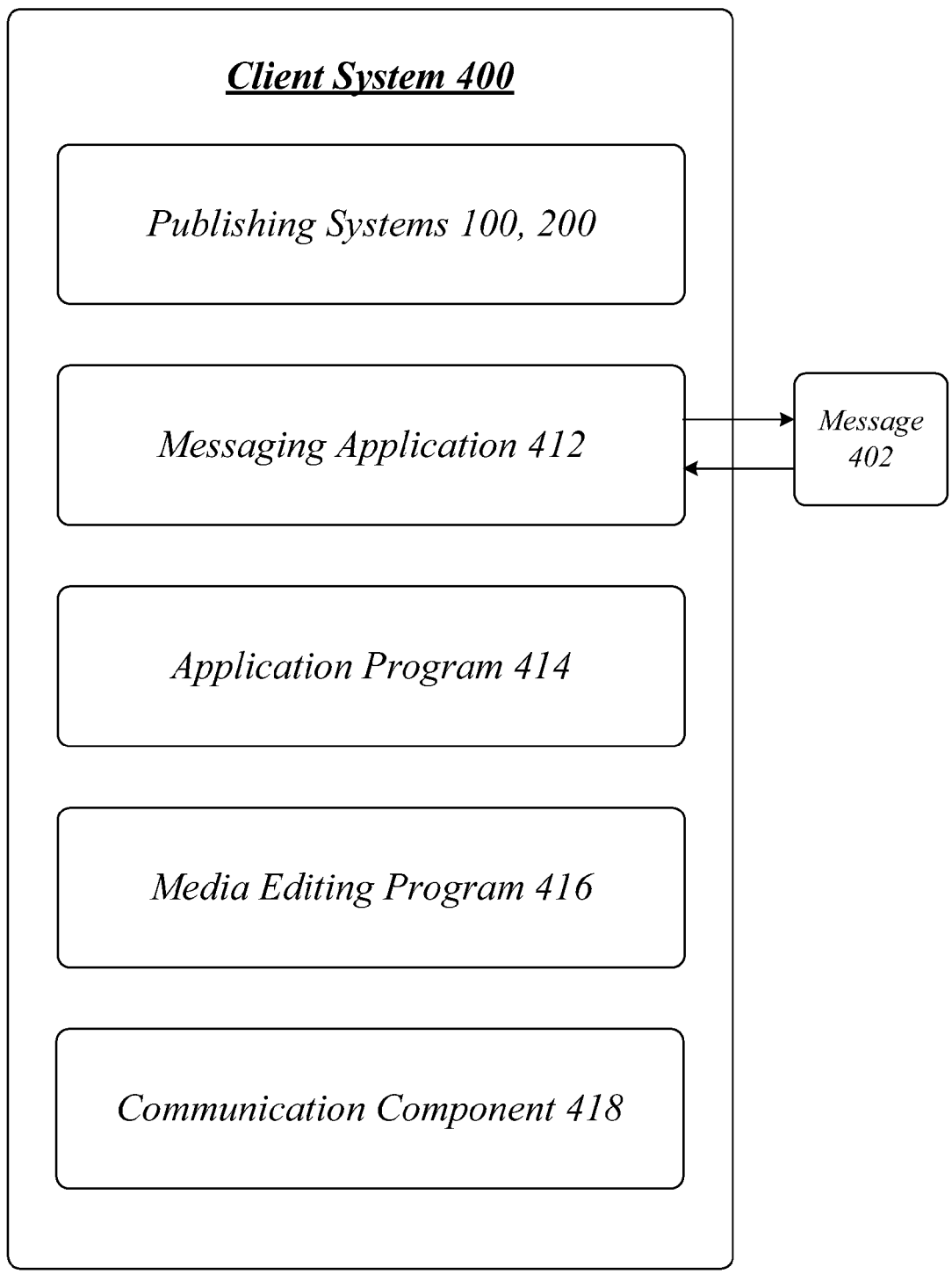
FIG. 4 illustrates an embodiment of a centralized system for implementing one or both publishing systems as described with reference to FIGS. 1, 2.

FIG. 4 illustrates a block diagram of a client system 400. The client system 400 may comprise a centralized system arranged to implement all of the structure and/or operations for the publishing systems 100, 200 in a single computing entity. In one embodiment, for example, the client system 400 may implement the structure and/or operations for the publishing systems 100, 200 entirely within a single computing device.

In the illustrated embodiment shown in FIG. 4, the client system 400 may comprise one or both of the publishing systems 100, 200, a messaging application 412, an application program 414, a media editing program 416, and a communication component 418. The messaging application 412 and the communication component 418 may be the same or similar to corresponding messaging application 312 and communication component 318 as described with reference to FIG. 3. The application program 414 may comprise any type of application program arranged to interoperate with the media sharing service 334 of the server system 330 as described with reference to FIG. 3.

The client system 400 may illustrate a case where the publishing systems 100, 200 define and execute publishing instructions on a single device. For instance, the client system 400 may implement the publishing systems 100, 200 to define a publishing instruction for execution by a component of the client system 400, such as the messaging application 412 and/or the application program 414.

In one embodiment, the media publishing component 130 may define an instruction to send the annotated media object 120 to a related member 104-1-$a$ using the messaging application 412 when in the offline mode. Rather than publish the annotated media object 120 through the media sharing service 334, the publishing member 106 may use the media publishing component 130 to define an instruction to send the annotated media object 120 directly to a related member 104-1-$a$ using the messaging application 412. The instruction queue component 220 may store the publish instruction in the instruction queue, and when the client system 310 enters an online mode, the instruction queue component 220 may send the publish instruction to the messaging application 412. The messaging application 412 may then send the annotated media object 120 to the related member 104-1-$a$ using a messaging channel. In one embodiment, for example, the messaging application 412 may send the annotated media object 120 as an attachment to a message 402. The message 402 may comprise any type of message in a variety of message formats as generated and/or transported by any number of different communications or messaging applications. Examples for the message may include without limitation a unified messaging (UM) message, an e-mail message, a voicemail message, an instant messaging (IM) message, a group IM message, a presence message, a short message service (SMS) message, a multimedia message service (MMS) message, a facsimile message, a gaming message, a social networking service (SNS) message, and/or other types of messages generated or transported by various communications and/or messaging programs, applications, or services in accordance with the described embodiments. Additionally or alternatively, the messaging application 412 may transport the annotated media object 120 using a faster transport, such as a separate transport designed for media objects, and the message 402 using a slower transport. The embodiments are not limited in this context.

In one embodiment, the media publishing component 130 may define an instruction to send the annotated media object 120 to the media sharing service 334 using the application program 414 when in the offline mode. The application program 414 may comprise any stand-alone application program arranged for communicating with a corresponding online version of the application program. Different media sharing services 334 typically have a stand-alone application program customized for interacting with an online version of the media sharing service. For instance, an online SNS such as FACEBOOK may have a corresponding application program implemented by a client device to communicate with the online version of FACEBOOK. The publishing systems 100, 200 may be arranged to interoperate with the application program 414, or may be implemented as a native component of the application program 414, to define one or more instructions for an online version of the application program 414, such as the media sharing service 334. In this case, the native features of the application program 414 may be used to execute the stored instructions and/or communicate the stored instructions for execution by the corresponding media sharing service 334.

The client system 400 may include the media editing program 416. The media editing program 416 may comprise any application program arranged to edit one or more properties of the media object 102 or the annotated media object 120. Properties of the media object 102 or the annotated media object 120 may include image size alteration, cropping an image, creating histograms, noise reduction, removal of unwanted elements, color change, image orientation, perspective control and distortion, sharpening and softening images, selecting and merging images, slicing of images, special effects, changing color depth, contrast change and brightening, color adjustments, printing, and so forth. Examples for the media editing program 416 may include without limitation WINDOWS PHOTO GALLERY and WINDOWS LIVE PHOTO GALLERY, both made by MICROSOFT Corporation, Redmond, Wash. Other media editing programs may be used as well.

Figure 5:
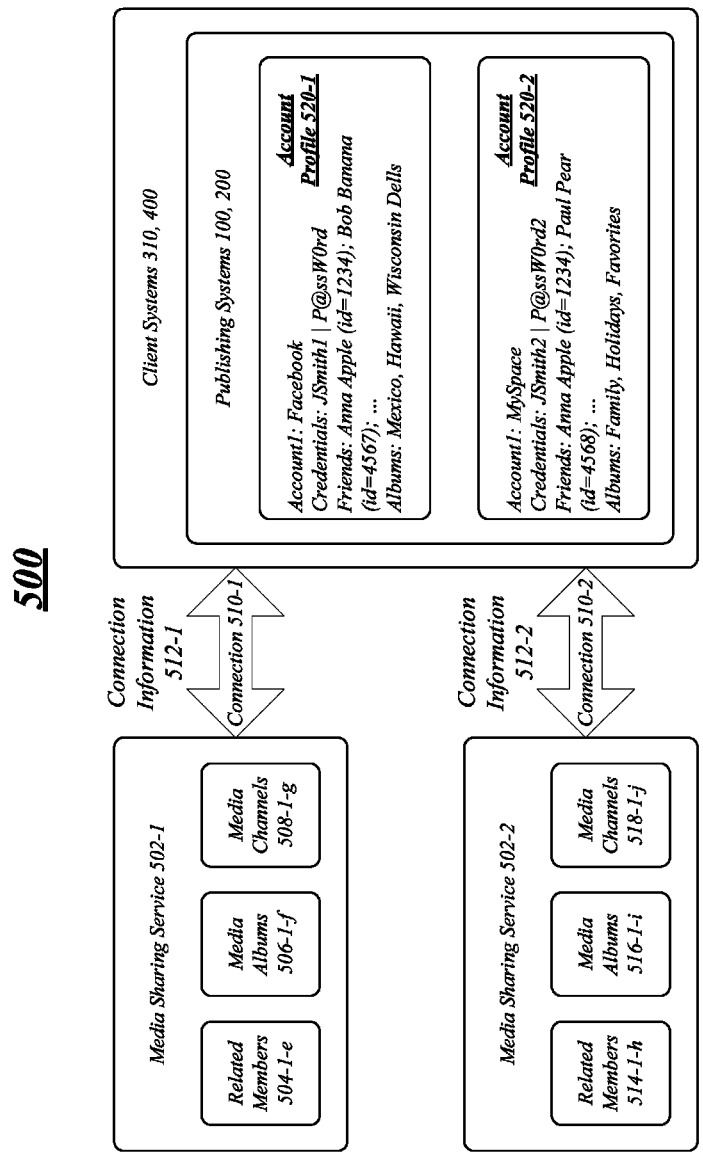
FIG. 5 illustrates an embodiment of a logical view of the first and second publishing systems with account profiles.

FIG. 5 illustrates a logical view 500 of the publishing systems 100, 200 when creating and managing different account profiles for different media sharing services 502-1-$c$ for the client systems 310, 400. As previously described with reference to FIG. 2, the connection manager component 210 may be arranged to generally manage connections for various media sharing services on behalf of the publishing systems 100, 200. The connection manager component 210 may store multiple sets of connection information 512-1-*d* for different media sharing services 502-1-*c*, and use the connection information 512-1-*d* to automatically connect to the different media sharing services 502-1-*c* when in an online mode. For instance, the connection manager component 210 may establish connections 510-1-*p* to retrieve connection information 512-1-*d* from each of the media sharing services 502-1-*c*. When the client systems 310, 400 are connecting to a media sharing service 502-1-*c* for a first time, the publishing member 106 may intervene to provide connection information 512-1-*d* to initially establish the connections 510-1-*p*. Thereafter, the connection manager component 210 may automatically connect to a user account of a media sharing service when in the online mode using a set of connection information 512-1-*d*, and establish a connection 510-1-*p* with a media sharing service 502-1-*c* automatically with little if any human intervention by the publishing member 106. In one embodiment, for example, human intervention by the publishing member 106 may be limited to providing user interface views requesting decisions from the publishing member 106 (e.g., "Would you like to connect to MICROSOFT LIVE"), and receiving control directives representing decisions made by the publishing member 106.

In the illustrated embodiment shown in FIG. 5, the connection manager component 210 may manage multiple sets of connection information 512-1-*d* for multiple user accounts of multiple media sharing services 502-1-*c*. Each set of connection information 512-1-*d* may include a list of related members, a list of media albums and/or a list of media channels. For instance, assume a media sharing service 502-1 is FACEBOOK and a media sharing service 502-2 is MYSPACE. The connection manager component 210 may retrieve and store sets of connection information 512-1, 512-2 for user accounts of the respective media sharing services 502-1, 502-2 in respective account profiles 520-1, 520-2 for the publishing member 106. As shown, the account profile 520-1 may comprise the following set of connection information 512-1:

Account 1: Facebook
Credentials: JSmith1|P@ssW0rd
Friends: Anna Apple (id=1234); Bob Banana (id=4567);
Albums: Mexico, Hawaii, Wisconsin Dells Similarly, the account profile 520-2 may comprise the following set of connection information 512-2:

Account1: MySpace
Credentials: JSmith2|P@ssW0rd2
Friends: Anna Apple (id=1234); Paul Pear (id=5678);
Albums: Family, Holidays, Favorites In one embodiment, each set of connection information 512-1, 512-2 may include an account identifier such as "JSmith1" and a security credential such as "p@ssW0rd" for respective user accounts established for the media sharing services 502-1, 502-2. Additionally or alternatively, the security credential can be implemented using a different security scheme, such as authentication tokens, for example.

In one embodiment, each set of connection information 512-1, 512-2 may include various lists of related members 504-1-*e*, 514-1-*h* for the respective media sharing services 502-1, 502-2. For instance, a list of related members 504-1, 504-2 may include "Anna Apple (id=1234)" and "Bob Banana (id=4567)," and a list of related members 514-1, 514-2 may also include "Anna Apple (id=1234)" and "Bob Banana (id=4567)." In this case, the lists of related members 504-1-*e*, 514-1-*h* are identical. It may be appreciated that in other cases the lists of related members 504-1-*e*, 514-1-*h* may be non-identical with some varying degrees of overlapping friends or no overlapping friends at all.

In one embodiment, each set of connection information 512-1, 512-2 may include varying lists of media albums 506-1-*f*, 516-1-*i* for the respective media sharing services 502-1, 502-2. The connection manager component 210 may receive lists of media albums 506-1-*f*, 516-1-*i* for the respective media sharing services 502-1, 502-2 when in the online mode. The connection manager component 210 may store the lists of media albums 506-1-*f*, 516-1-*i* for user accounts of the respective media sharing services 502-1, 502-2 in the account profiles 520-1, 520-2 for the user accounts.

In one embodiment, each set of connection information 512-1, 512-2 may include varying lists of media channels 508-1-*g*, 518-1-*j* for the respective media sharing services 502-1, 502-2. The connection manager component 210 may receive the lists of media channels 508-1-*g*, 518-1-*j* for the respective media sharing services 502-1, 502-2 when in the online mode. The connection manager component 210 may store the lists of media channels 508-1-*g*, 518-1-*j* for user accounts of the respective media sharing services 502-1, 502-2 in the account profiles 520-1, 520-2 for the user accounts.

In one embodiment, the media publishing component 130 may define an instruction to publish the annotated media object 120 to a media album for a user account of a media sharing service when in the offline mode. For instance, assume the publishing member 106 uses the media publishing component 130 to define a publishing instruction to publish the annotated media object 120 to a media album 506-1 for a user account of the media sharing service 502-1 when in the offline mode. When the client systems 310, 400 enter an online mode, the publishing systems 100, 200 may send and/or execute the publishing instruction for publishing the annotated media object as part of the media album 506-1.

In one embodiment, the media publishing component 130 may define an instruction to publish the annotated media object to a media channel for a user account of a media sharing service when in the offline mode. For instance, assume the publishing member 106 uses the media publishing component 130 to define a publishing instruction to publish the annotated media object 120 to a media channel 518-1 for a user account of the media sharing service 502-2 when in the offline mode. When the client systems 310, 400 enter an online mode, the publishing systems 100, 200 may send and/or execute the publishing instruction for publishing the annotated media object 120 as part of the media channel 518-1. Subscribers to the media channel 518-1 may be notified of the newly published annotated media object 120 using conventional notification techniques implemented for the media sharing service 502-2.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein, such as the publishing systems 100, 200.

In the illustrated embodiment shown in FIG. 6, the logic flow 600 may receive a list of related members with a defined relationship with a publishing member from a user account of a media sharing service when in an online mode at block 602. For example, the media annotation component 110 of the publishing systems 100, 200 may receive the list of related members 104-1-a with a defined relationship with the publishing member 106 from user accounts of the media sharing services 502-1, 502-2 when in an online mode. The list of related members 104-1-a may be stored separately or integrated with a contact database implemented for a computing device implementing the publishing systems 100, 200.

The logic flow 600 may associate a portion of an image of a person presented in a media object with a related member from the list of related members when in an offline mode at block 604. For example, the media annotation component 110 may associate a portion of an image of a person presented in the media object 102 with a related member 104-1 from the list of related members 104-1-a when in an offline mode. In other words, the media annotation component 110 may perform tagging operations for the media object 102 when implemented as a photograph or video.

The logic flow 600 may generate metadata for the media object based on the association between the person presented in the media object and the related member when in the offline mode to form an annotated media object at block 606. For example, the media annotation component 110 may generate metadata 116-4 for the media object 102 based on the association between the person presented in the media object 102 and the related member 104-1 when in the offline mode to form the annotated media object 120. The metadata 116-4 may be stored with the annotated media object 120 and/or as part of the object record 114 for the annotated media object 120.

The logic flow 600 may define one or more instructions to share the annotated media object with a related member when in the offline mode at block 608. For example, the media publishing component 130 may define one or more instructions to share the annotated media object 120 with the related member 104-1 when in the offline mode. An example of an instruction could be a publishing instruction to publish the annotated media object 120 as part of the media sharing services 502-1, 502-1, such as for an online media album or media channel, or to directly send the annotated media object to one or more related members 104-1-a.

The logic flow 600 may store the one or more instructions in an instruction queue when in the offline mode for execution when in the online mode at block 610. For example, the media publishing component 130 may request (or call) the instruction queue component 220 to store the one or more instructions in an instruction queue when in the offline mode for execution when in the online mode. In one embodiment, the stored instructions may be executed by an application program and/or service implemented with the publishing system 100, 200, such as the messaging applications 312, 412, the web browser 314, the application program 414, the media editing program 416, and some other client side application program and/or service. In one embodiment, the stored instructions may be executed by an application program and/or or service implemented separately from the publishing system 100, 200, such as on a remote device such as the server system 330, including the messaging application 332, the media sharing service 334, the media album 335, the media channel 336, or some other server side application program and/or service.

Additionally or alternatively, the media annotation component 110 of the publishing systems 100, 200 may also receive other types of information associated with the publishing member 106 from user accounts of the media sharing services 502-1, 502-2 when in an online mode. For instance, the media annotation component 110 may also receive events related to the publishing member 106, groups related to the primary user, textural keyword tags or other metadata previously used by the primary user, celebrity and/or brand pages of which the user is a fan or follower, and other types of data or metadata for the publishing member 106 that might be useful for performing media editing operations when operating in an offline mode, The embodiments are not limited to the list of related members 104-1-a, and any type of data or metadata associated with the publishing member 106 may be retrieved from user accounts of the media sharing services 502-1-c as consistent with the described embodiments. The embodiments are not limited in this context.

Figure 7:
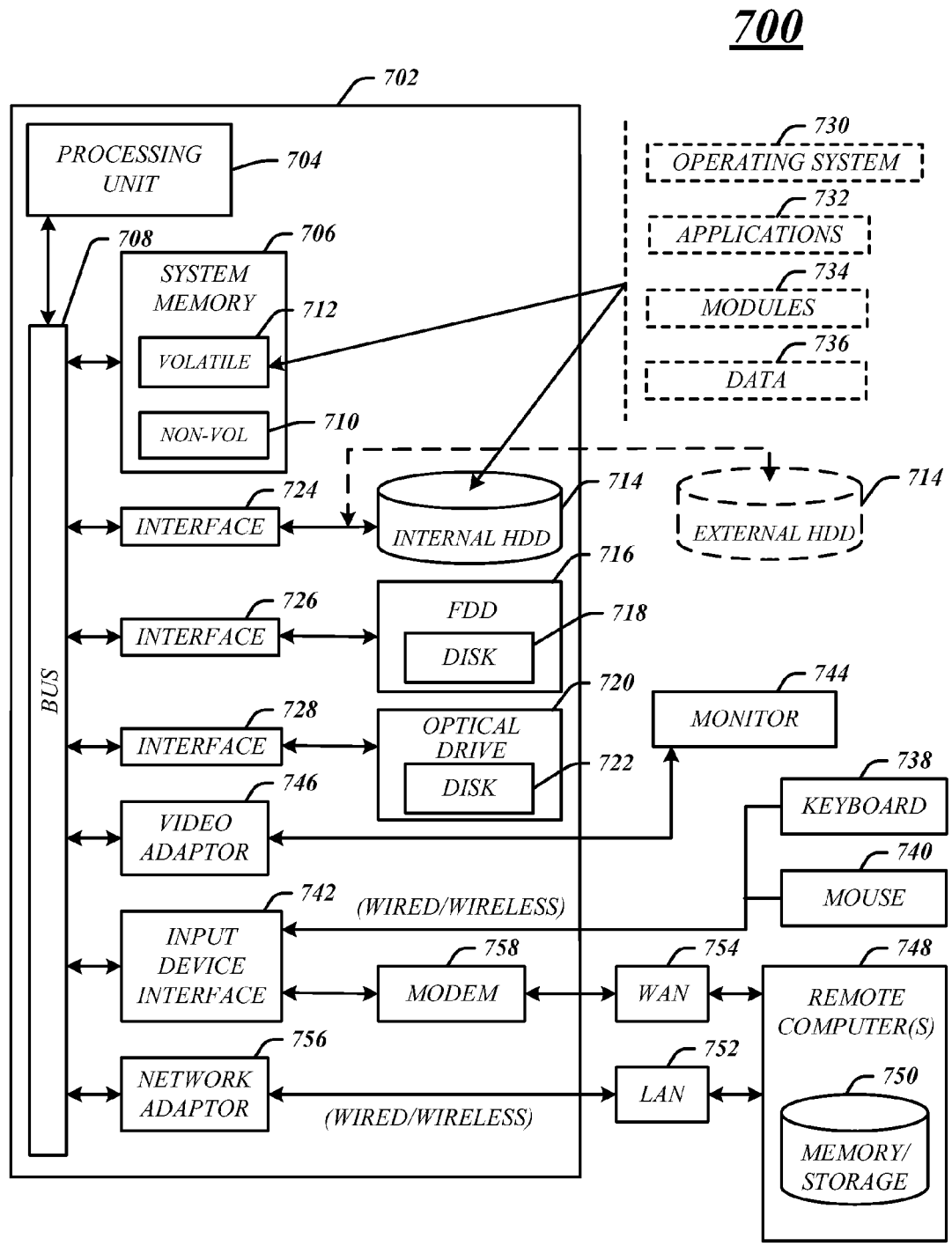
FIG. 7 illustrates an embodiment of a computing architecture for implementing a publishing system.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the publishing systems 100, 200, the media annotation component 110, the media publishing component 130, the connection component 210, the instruction queue component 220, the messaging applications 312, 332 and 412, the web browser 314, the media sharing service 334, and so forth.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
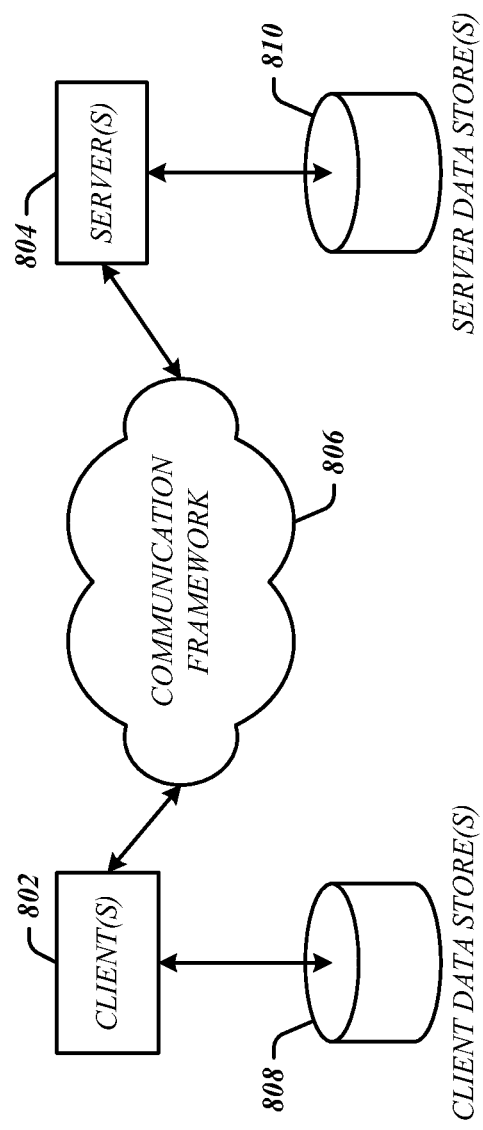
FIG. 8 illustrates an embodiment of a communications architecture for implementing a publishing system.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
  receiving a list of related members having a defined relationship with a publishing member from a user account of a media sharing service when in an online mode;
  associating an image of a person presented in a media object with a related member from the list of related members when in an offline mode;
  generating metadata for the media object based on the association between the image of the person presented in the media object and the related member when in the offline mode;
  generating an object record comprising a user name, an account name, an object name, and the metadata, to form an annotated media object from the media object and the object record;
  defining one or more instructions to share the annotated media object with a related member when in the offline mode; and
  storing the one or more instructions in an instruction queue when in the offline mode for execution when in the online mode.

2. The computer-implemented method of claim 1, comprising executing the one or more instructions to share the annotated media object with the related member when in the online mode in a sequential manner or a parallel manner.

3. The computer-implemented method of claim 1, comprising managing multiple sets of connection information for multiple user accounts of multiple media sharing services, each set of connection information including an account identifier and security credentials to access each user account of each media sharing service.

4. The computer-implemented method of claim 1, comprising automatically connecting to the user account of the media sharing service when in the online mode using a set of connection information including an account identifier and security credentials for the user account.

5. The computer-implemented method of claim 1, comprising:
receiving a list of media albums and media channels for the user account of the media sharing service when in the online mode; and
storing the list of related members, the list of media albums, and the list of media channels in an account profile for the user account.

6. The computer-implemented method of claim 1, comprising generating a metadata tag with identification information for the related member when in the offline mode.

7. The computer-implemented method of claim 1, comprising storing a metadata tag with identification information for the related member as part of hierarchical set of metadata terms when in the offline mode.

8. The computer-implemented method of claim 1, comprising defining an instruction to publish the annotated media object to a media album for a user account of a media sharing service when in the offline mode.

9. The computer-implemented method of claim 1, comprising defining an instruction to publish the annotated media object to a media channel for a user account of a media sharing service when in the offline mode.

10. The computer-implemented method of claim 1, comprising defining an instruction to send the annotated media object to the related member using a messaging application when in the offline mode.

11. An article comprising a storage device containing instructions that if executed enable a system to receive a list of related members having a defined relationship with a publishing member from a user account of the publishing member of a media sharing service when in an online mode, associate an image of a person presented in a media object with a related member from the list of related members when in an offline mode, generate metadata for the media object using the list of related members when in the offline mode, generate an object record comprising a user name, an account name, an object name, and the metadata, to form an annotated media object from the media object and the object record, and define at least one instruction to distribute the annotated media object to a related member when in the online mode.

12. The article of claim 11, further comprising instructions that if executed enable the system to edit one or more properties of the media object or the annotated media object.

13. The article of claim 11, further comprising instructions that if executed enable the system to manage multiple sets of connection information for multiple media sharing services including the one or more media sharing services from which the one or more media objects were received, with each set of connection information including an account identifier and security credentials for a user account of a given media sharing service.

14. The article of claim 11, further comprising instructions that if executed enable the system to automatically connect to the user account of the media sharing service when in the online mode using a set of connection information including an account identifier and security credentials for the user account.

15. The article of claim 11, further comprising instructions that if executed enable the system to receive data or metadata associated with the publishing member from a user account of the publishing member of the media sharing service when in an online mode, generate metadata for the media object using the data or metadata associated with the publishing member when in an offline mode to form the annotated media object.

16. An apparatus, comprising:
a processor; and
a memory communicatively coupled to the processor, the memory to store a media annotation component and a media publishing component, the media annotation component when executed by the processor operative to receive a list of related members having a defined relationship with a publishing member from a user account of the publishing member of a media sharing service when in an online mode, associate an image of a person presented in a media object with a related member from the list of related members when in an offline mode, and generate metadata for the media object using the list of related members when in the offline mode, generate an object record comprising a user name, an account name, an object name, and the metadata, to form an annotated media object from the media object and the object record, and the media publishing component when executed by the processor operative to define at least one instruction to distribute the annotated media object to a related member when in the online mode.

17. The apparatus of claim 16, the media annotation component operative to associate a portion of an image of a person presented in the media object with a related member from the list of related members when in an offline mode, and generate metadata for the media object based on the association between the person presented in the media object and the related member to form the annotated media object when in the offline mode.

18. The apparatus of claim 16, comprising a connection component operative to manage multiple sets of connection information for multiple user accounts of multiple media sharing services, each set of connection information including an account identifier and security credentials to access each user account of each media sharing service, and automatically connecting to the user account of the media sharing service when in the online mode using a set of connection information including an account identifier and security credentials for the user account.

19. The apparatus of claim 16, comprising an instruction queue component operative to manage storing the at least one instruction in an instruction queue when in the offline mode, and executing the at least one instruction from the instruction queue when in the online mode.

20. The apparatus of claim 16, comprising a messaging application operative to communicate the annotated media object with the media sharing service or the related member.

* * * * *